US007149518B2

(12) United States Patent
Attimont et al.

(10) Patent No.: US 7,149,518 B2
(45) Date of Patent: Dec. 12, 2006

(54) METHOD OF RECONNECTING RADIOCOMMUNICATION TERMINAL TO A NETWORK, AND A CORRESPONDING TERMINAL

(75) Inventors: Luc Attimont, Saint Germain en Laye (FR); Jannick Bodin, Garches (FR)

(73) Assignee: Alcatel, Paris (FR)

( * ) Notice: Subject to any disclaimer, the term of this patent is extended or adjusted under 35 U.S.C. 154(b) by 347 days.

(21) Appl. No.: 09/862,600

(22) Filed: May 23, 2001

(65) Prior Publication Data

US 2001/0046861 A1   Nov. 29, 2001

(30) Foreign Application Priority Data

May 25, 2000   (FR) .................................. 00 06687

(51) Int. Cl.
*H04Q 7/20*   (2006.01)
*H04Q 7/38*   (2006.01)

(52) U.S. Cl. .................. 455/434; 455/455; 455/422.1; 455/403; 455/161.1; 455/161.2; 455/161.3; 455/515; 370/343; 370/329; 375/132

(58) Field of Classification Search ................ 455/434, 455/455, 432.1, 422.1, 403, 500, 517, 161.1, 455/161.2, 161.3, 166.3, 168.1, 180.1, 182.1, 455/185.1, 203, 450.1, 552.1, 515, 62, 445; 370/343, 329; 375/132, 134, 137
See application file for complete search history.

(56) References Cited

U.S. PATENT DOCUMENTS

| | | | | |
|---|---|---|---|---|
| 5,257,400 | A * | 10/1993 | Yoshida | 455/434 |
| 5,701,585 | A | 12/1997 | Kallin et al. | 455/33.2 |
| 6,011,960 | A * | 1/2000 | Yamada et al. | 455/77 |
| 6,223,037 | B1 * | 4/2001 | Parkkila | 455/434 |
| 6,282,419 | B1 * | 8/2001 | Findikli | 455/434 |
| 6,343,070 | B1 * | 1/2002 | Klas et al. | 455/422.1 |
| 6,418,318 | B1 * | 7/2002 | Bamburak et al. | 455/434 |
| 6,807,163 | B1 * | 10/2004 | Shi | 370/337 |

FOREIGN PATENT DOCUMENTS

EP         0 840 532 A2     5/1998

* cited by examiner

*Primary Examiner*—Keith Ferguson
(74) *Attorney, Agent, or Firm*—Sughrue Mion, PLLC

(57) ABSTRACT

A method of connecting to a radiocommunication network a terminal which is in a standby mode because of temporary unavailability of the signal from the network includes a step of periodically scanning frequencies of the radiocommunication network using one or more sequences each associated with a predetermined list of frequencies selected from all the frequencies.

15 Claims, 3 Drawing Sheets

METHOD OF RECONNECTING RADIOCOMMUNICATION TERMINAL TO A NETWORK, AND A CORRESPONDING TERMINAL

BACKGROUND OF THE INVENTION

Field of the Invention

The present invention relates to a method of reconnecting a radiocommunication terminal to a network. The method can increase the autonomy of the terminal (the time before the battery must be recharged) and reduce its wake-up time when a signal is again available. The present invention also relates to the corresponding terminal.

Description of the Prior Art

Radiocommunication terminals such as GSM or DECT cellular telephones, for example, must be within an area covered by a base station transmitting a signal in order to receive and send voice or other data.

Each transmitter delimits a geographical area referred to as a cell within which data reception is satisfactory. The density with which the cells, and therefore the transmitter stations, are distributed depends on their geographical location.

An urban area or a busy road has a relatively dense coverage, except in confined spaces such as car parks or indoor spaces (cinemas, theatres, etc), where reception is virtually impossible.

A mountainous or sparsely populated region has fewer stations, which are therefore further apart, and is less well covered.

To assure the user optimum signal reception regardless of their geographical location, the terminal scans the available frequencies continuously, using processes known in the art.

The quality of the received signal varies as the user moves around.

The signal becomes progressively weaker on moving away from the transmitter station of the cell in which the terminal is located. The terminal scans the various frequencies in the GSM band until it detects a signal of better quality than the signal it is currently using to communicate.

Once the new signal has been detected, the terminal uses means known in the art to connect to the new station, i.e. to change cell by selecting a cell adjacent the preceding one.

If no network is available, the terminal goes to a standby mode and scans the frequencies in a relatively wide frequency band, or even several bands in the case of a multi-band terminal, at varying intervals, until a new cell can be selected.

In one prior art method the standby time of the terminal between two consecutive searches is increased, for example up to a maximum, and the search for a network then continues at regular intervals and covers all the frequencies.

The search for a terminal activates a large number of components in the terminal, leading to high power consumption and reducing the autonomy of the terminal.

The wake-up time, i.e. the time the terminal takes to change from a standby state to a signal receiving state as soon as an available network is detected, is long because all of the frequencies that the network can use are searched for a signal.

If the user enters a place where the network is not available, such as a car park or a tunnel, signal reception is suddenly interrupted and the terminal cannot access the network.

With prior art network detection methods, the terminal periodically searches all the frequencies of an available network even though it has just stopped using a particular frequency providing a high reception level.

This search consumes additional energy unnecessarily.

Quite apart from their excessive energy consumption, the prior art methods lead to long standby periods and relatively long wake-up times, during which the user cannot receive calls.

The long wake-up times also constitute a drawback for the network operators, who cannot offer services during these periods.

This being the case, an object of the invention is to alleviate the above drawbacks by proposing a method which reduces the power consumption of a radiocommunication terminal when no network is available and reduces its wake-up time as soon as a network is available again.

SUMMARY OF THE INVENTION

The invention provides a method of connecting to a radiocommunication network a terminal which is in a standby mode because of temporary unavailability of the signal from the network, the method including a step of periodically scanning frequencies of the radiocommunication network using one or more sequences each associated with a predetermined list of frequencies from all the frequencies.

The list of frequencies associated with each sequence advantageously varies or does not vary.

The method preferably includes a step of storing the last frequencies available before disconnection from the network so that the first scanning sequence scans the last available frequencies.

A first embodiment of the method includes a step of measuring the intensity of the last available frequencies of the signal before disconnection from the network and the frequency scanning is partial only if the intensity of the last frequencies available exceeds a predetermined threshold value.

One embodiment of the method includes a step of determining the number of last frequencies available before disconnection from the network carrying a signal of intensity greater than a predetermined threshold value and the frequency scanning is partial only if the number of last frequencies available carrying a signal of intensity greater than a predetermined threshold intensity is itself greater than a given number.

The invention further provides a terminal adapted to be connected to one or more radiocommunication networks operating on different frequencies, the terminal including means for partially scanning the frequencies of the network using one or more sequences each of which is associated with a predetermined list of frequencies selected from all the frequencies.

A preferred embodiment of the terminal further includes means for selecting partial or complete scanning of the various frequencies.

The invention will be better understood in the light of the following description of one illustrative and non-limiting embodiment of the invention, which description is given with reference to the accompanying drawings.

DETAILED DESCRIPTION OF THE PREFERRED EMBODIMENTS

When the user of a radiocommunication terminal such as a mobile telephone moves around, the quality of the signal the terminal receives from the network constantly varies.

The terminal searches for an optimum operating frequency in order to connect to the station transmitting at that frequency.

The signal intensity variations are stronger or weaker, depending on the geographical configuration of the area in which the terminal user is moving around.

Two main situations are encountered.

The stations are relatively far apart in an area in which the coverage of the network is relatively weak, such as a mountainous region, or when the user is travelling fast on a road.

Figure 1:
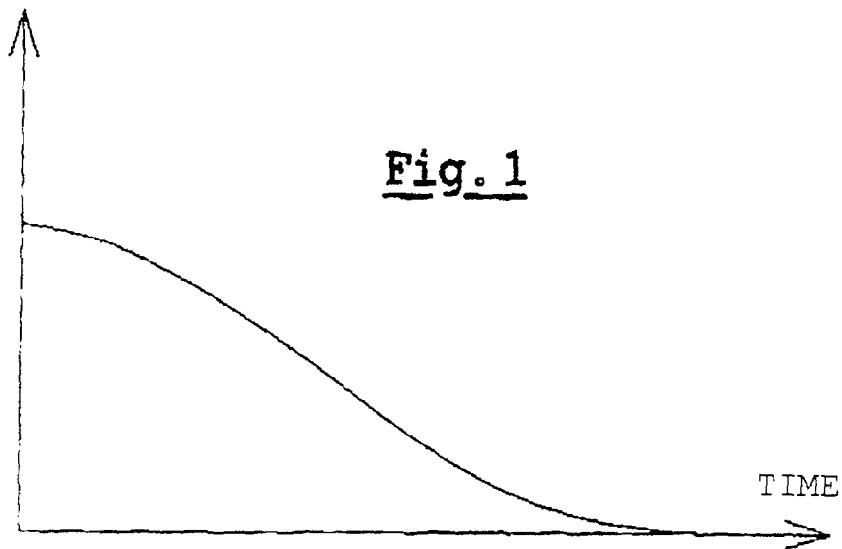
FIGS. 1 and 2 are graphs showing signal intensity variations.

On moving away from the station to which the terminal is connected, the intensity of the received signal progressively falls away, as shown in FIG. 1, in which time is plotted on the abscissa axis and the received signal intensity is plotted on the ordinate axis.

The intensity falls to a value that is too low for satisfactory operation of the terminal. At this time the terminal either connects to an adjoining station providing a stronger signal as soon as that signal is detected or goes to the standby mode if no signal is available.

Figure 2:
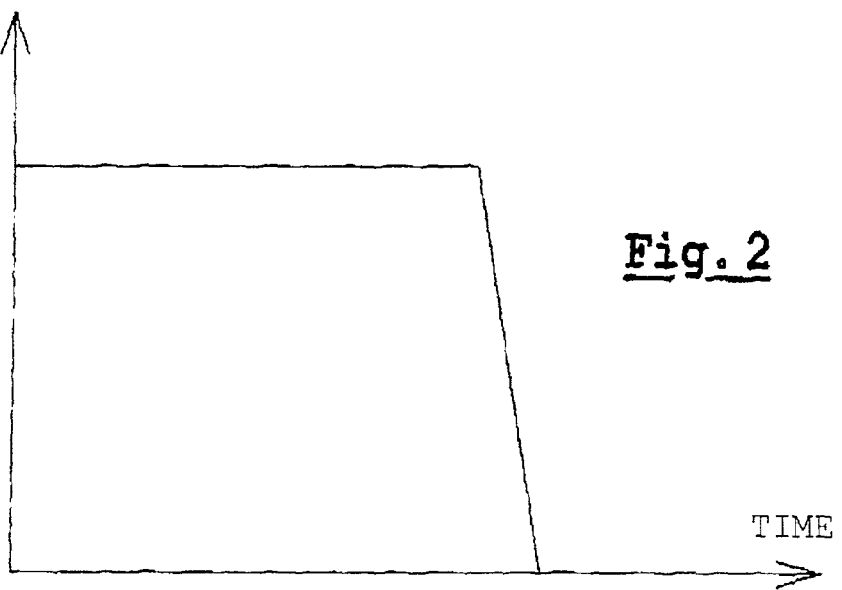

The received signal intensity drops suddenly, in fact almost immediately, as shown in FIG. 2, on passing through a tunnel, for example, or on entering a car park. On leaving a tunnel the terminal reconnects to the same station or to a new station whose signal is substantially as strong, whereas on leaving a car park the terminal finds a signal with the same operating frequency as at the entry to the car park.

The terminal goes to the standby mode when it is in a tunnel or a car park.

Figure 3:
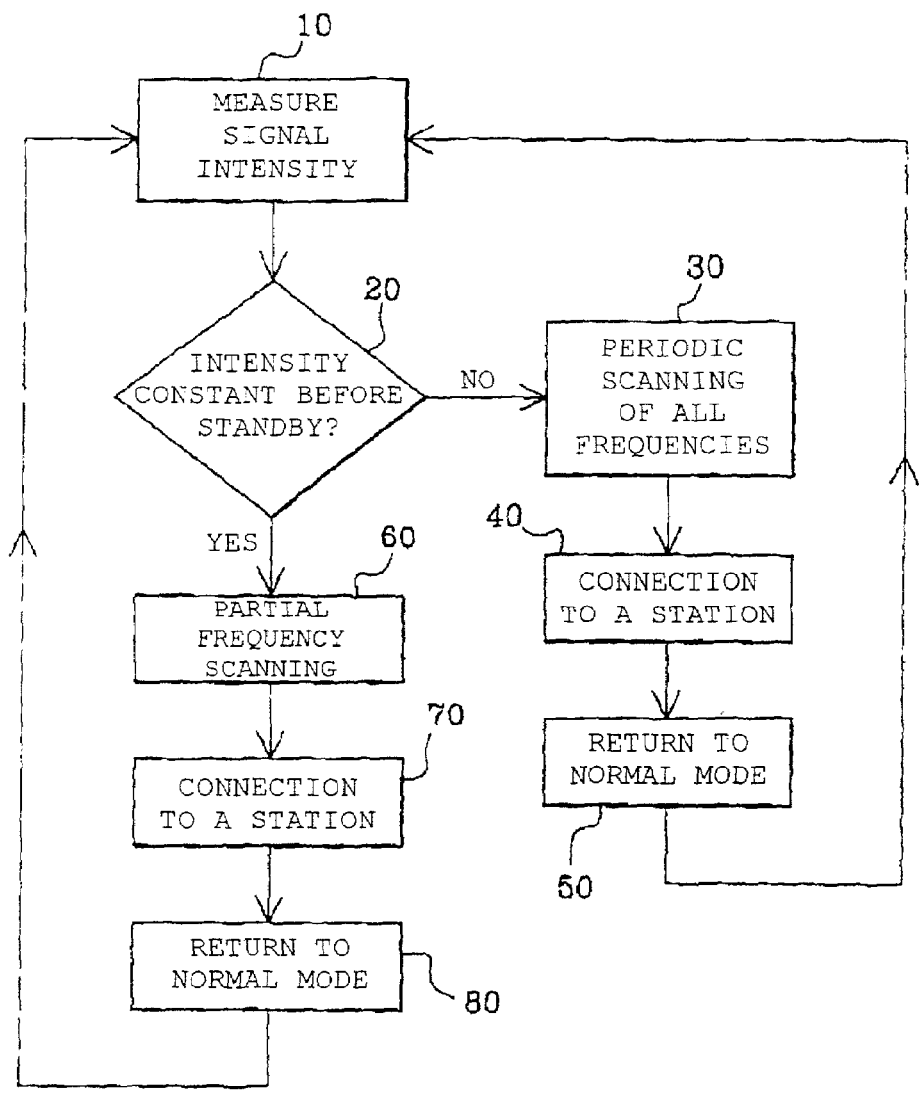
FIG. 3 is a flowchart showing one embodiment of a method according to the invention.

FIG. 3 is a flowchart of one particular embodiment of a method according to the invention enabling the terminal to search for an available signal. This embodiment reduces power consumption and limits the wake-up time.

In this preferred embodiment, the terminal continuously measures the intensity of the signal that it receives, as indicated in step 10. The intensity of the signal can be measured by any available means.

As previously explained, the terminal does not detect any signal and enters the standby mode if no network is available.

The next step 20 of the FIG. 3 method is a decision step, with the aim, in one particular embodiment, of determining whether the intensity of the signal received by the terminal was constant during the period preceding entry of the terminal into the standby mode.

A range of variation can be programmed in the terminal using any available means, for example:

if the value of the intensity of the received signal remains within that range of variation throughout the period preceding entry into the standby mode, then the intensity is considered to be constant (this situation corresponds to the case in which the intensity of the signal falls suddenly on entering the standby mode, as shown in FIG. 2), and if, on the other hand, the intensity of the signal decreased progressively during the period preceding the entry of the terminal into the standby mode, then the situation is that shown in FIG. 1.

In the latter case, the terminal periodically scans all the frequencies of the network, in a manner known in the art. This is step 30 of the method.

The terminal returns to the standby mode if it does not detect any signal during each complete scan of the frequency range.

As soon as an available signal is detected, the terminal connects to the station transmitting that signal (step 40).

As soon as it is reconnected, the terminal is able to receive and send data via the detected station and can therefore revert to the normal mode (step 50).

If the intensity of the signal received by the terminal is constant during the period preceding entry of the terminal into the standby point (step 20), then the terminal performs only a partial scan of the frequencies of the network (step 60).

This is because the situation is that shown in FIG. 2, i.e. the terminal has just left an area covered by a high-level signal, for example when the user of the terminal enters an indoor space, a car park, a tunnel, etc.

To avoid unnecessary power consumption, the terminal does not scan all of the frequencies, but only a relatively narrow range of frequencies, in accordance with a given algorithm. The terminal "wakes up" more often than in the case of prior art algorithms, but in order to scan a narrower range of frequencies. This step 60 is described in more detail with reference to FIG. 4.

As soon as the terminal detects an available signal at a sufficient level, it connects to the station transmitting said signal in a manner that is known in the art (step 70).

Able to receive and to send data again, the terminal returns to the normal mode (step 80).

In one embodiment, during the decision step 20, the terminal uses means known in the art to determine the number of frequencies received with an intensity greater than a particular intensity during the period preceding its entry into the standby mode.

Thus a low number of frequencies (for example a number less than a value programmed in the terminal, or possibly even a single frequency) received with sufficient intensity during the period preceding the entry of the terminal into the standby mode indicates that the terminal was in a geographical area in which the coverage of the network is weak before it entered the standby mode.

The terminal then periodically scans all frequencies of the network, as described for step 30.

On the other hand, if the number of frequencies received with sufficient intensity during the period preceding the entry of the terminal into the standby mode is greater than a given minimum number of frequencies programmed in the terminal, then the coverage in the area in which the terminal was then located was dense.

This situation corresponds to that in which the terminal has just suddenly left an area with sufficient coverage, as shown in FIG. 2.

The terminal then uses a given algorithm to scan only some of the frequencies (step 60), before connecting to a station (step 70) and then returning to the normal mode (step 80).

Accordingly, in a preferred embodiment, the terminal includes means for measuring and storing at any time the number of signals that it receives and their intensity, for example in order to determine whether the intensity of those signals is constant or not just before entering the standby mode.

Figure 4:
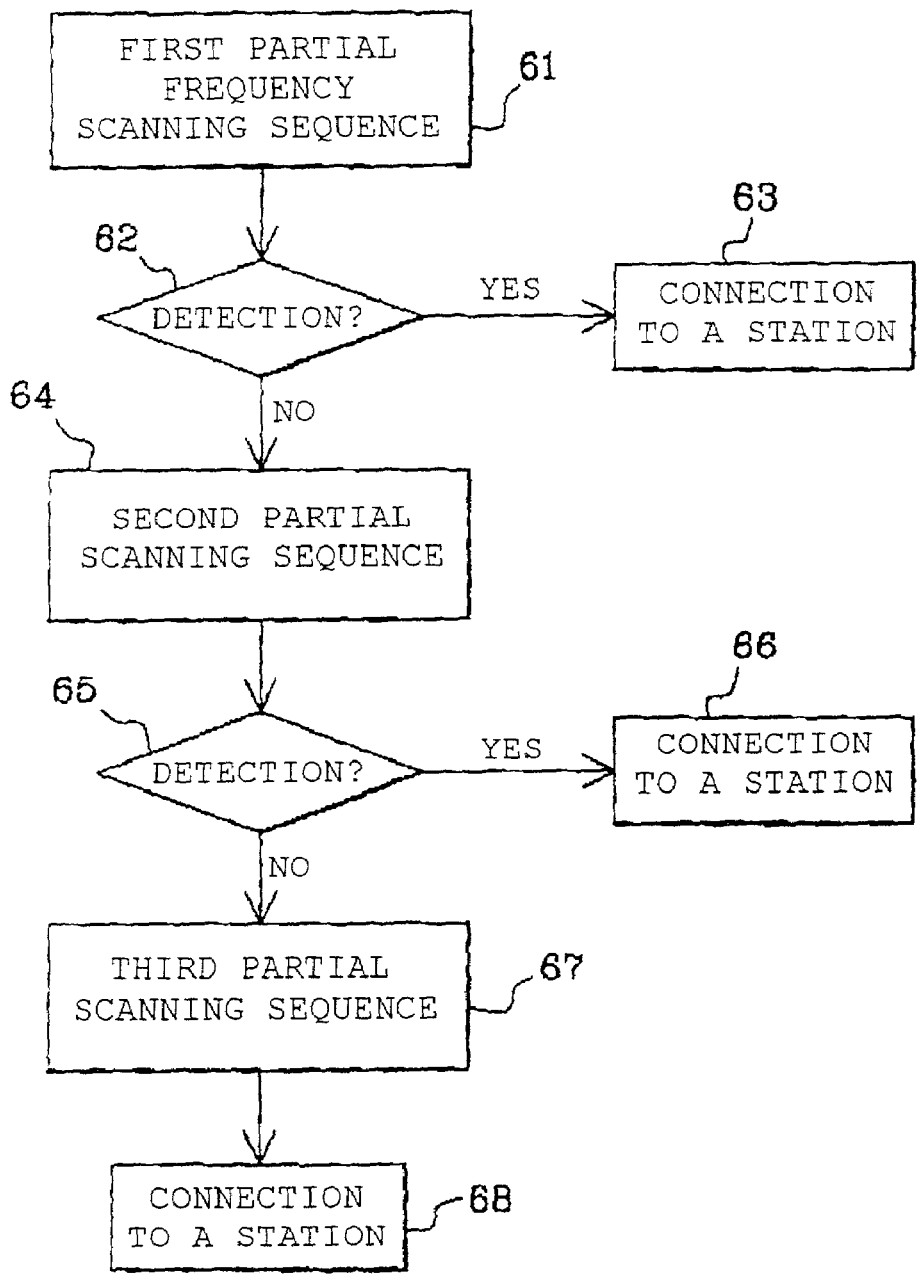
FIG. 4 is a flowchart of another embodiment of a method according to the invention.

FIG. 4 is a more detailed flowchart of step 60 from FIG. 3, which represents an embodiment of the partial frequency scanning algorithm.

Partial frequency scanning by the terminal is effected in accordance with different sequences. In order to optimize the search for an available signal, the range of frequencies scanned in each sequence is different.

As in step 30, the terminal can enter into the standby mode for a shorter or longer time period between sequences. However, it is advantageous if the standby time is less than that between two sequences scanning all the frequencies, as described for step 30 in FIG. 3.

As already explained, the terminal "wakes up" more often than in step 30, but then scans a narrower range of frequencies.

In the embodiment of the method shown in FIG. 4, the first partial scanning sequence can consist of scanning the last available frequencies placed in memory by the terminal just before it entered the standby state, for example (step 61).

The terminal may or may not have used the lost available frequencies before it entered the standby mode.

If the user of the terminal enters an indoor space or a car park, for example, the first available frequency on leaving the indoor space or the car park corresponds to the last frequency available before entry. There is therefore no need to scan all of the frequency range, which saves power and reduces the various standby times of the terminal.

Using the memory means in particular, the terminal therefore attempts to detect the signal that it was using and that it abandoned before entering the standby mode (step 62).

If that signal is again available, then the terminal connects to the station transmitting the signal (step 63) and returns to the normal mode.

In the normal mode, although it is already able to receive and send calls and data, the terminal can perform a further scan of the complete range of frequencies in order to select the signal with the highest level.

If the last signal picked up before entering the standby mode is no longer available, and is therefore not detected in step 62, the terminal performs a second scanning sequence, this time scanning another range of frequencies (step 64). The list of frequencies associated with the sequence of step 64 can contain some of the frequencies scanned in step 61.

If a signal is detected in these frequency ranges, then the terminal selects it and connects to the corresponding station (steps 65 and 66).

Otherwise, the terminal performs a third scanning sequence (step 67) to look for an available signal in a new range of frequencies, different from the previous one.

As soon as a signal of sufficient level is detected, the terminal connects to the corresponding station (step 68) and returns to the normal mode.

The number of sequences, and therefore of frequencies scanned, can be increased in this way until a signal is detected, enabling the terminal to connect.

The various frequency scanning sequences described in connection with steps 61, 64 and 67 are not limited to a single type of list, of course.

Different scanning algorithms can be used, for example where a first sequence scans a list of frequencies numbered from 0 to 9, then a second sequence scans those numbered from 10 to 19, and so on.

In another embodiment, the first scanning sequence can relate to the list of frequencies numbered 0, 10, 20, 30, etc. and the second to the frequencies numbered 1, 11, 21, 31, etc.

Whichever embodiment is chosen, the partial frequency scan is effected by means of a predetermined algorithm stored in the terminal.

Each sequence is associated with a predetermined list of frequencies that the terminal is going to scan. Note that each list of frequencies can be invariant or dynamic.

A given list can correspond to certain frequencies, which are always the same, or the various frequencies in the same list can change.

Also, as previously mentioned, the same frequencies can be in more than one list, associated with different scanning frequencies.

The choice of the various frequencies constituting a list can be random, depend on the radio map of the site on which the terminal is located, or be adapted to suit certain parameters, such as the nature of the radiocommunication operator, for example.

It is beneficial for a terminal operating with a specific operator to scan only the frequencies on which that operator transmits. Because the number of frequencies to be scanned is small, the time to wake up the terminal is reduced and the power consumed is also reduced accordingly, increasing the autonomy of the terminal.

Accordingly, regardless of the scanning sequences or the lists of frequencies associated with those sequences, the method in accordance with the invention significantly reduces the power consumption of a terminal in accordance with the invention and also reduces its wake-up time following unavailability of the network.

The invention claimed is:

1. A method of connecting to a radio communication network, intended for use in a terminal which periodically searches the radio communication network for a signal because of temporary unavailability of the signal from the network, said method comprising:
   periodically scanning frequencies of said radio communication network,
   when signal intensity received by the terminal was approximately constant before the search, the terminal performs a partial search by using one or more sequences each associated with a predetermined list of frequencies from all of said frequencies, and
   when signal intensity received by the terminal was not approximately constant before the search, the terminal first performs full search by scanning all of said frequencies.

2. The method claimed in claim 1 wherein said list of frequencies associated with each sequence does not vary.

3. The method claimed in claim 1 wherein said list of frequencies associated with each sequence varies.

4. The method claimed in claim 1 further comprising storing the last frequencies available before disconnection from the network so that the first scanning sequence scans said last available frequencies.

5. The method claimed in claim 4 further comprising measuring the intensity of the last available frequencies of the signal before disconnection from the network.

6. The method claimed in claim 5 wherein the frequency scanning is partial only when the intensity of the last frequencies available exceeds a predetermined threshold value.

7. The method claimed in claim 5 further comprising determining the number of last frequencies available before disconnection from the network carrying a signal of intensity greater than a predetermined threshold value.

8. The method claimed in claim 7 wherein the frequency scanning is partial only when said number of last frequencies available carrying a signal of intensity greater than a predetermined threshold intensity is itself greater than a given number.

9. The method as claimed in claim 1, wherein, when the signal intensity received by the terminal was approximately constant before a loss of service, the terminal performs the partial search, and wherein, when the signal intensity received by the terminal was not approximately constant before the loss of service, the terminal first performs the full search by scanning all of said frequencies.

10. A terminal adapted to be connected to one or more radio communication networks operating on different frequencies, said terminal comprising:
   means for determining what type of scanning to perform based on whether signal intensity is constant or not before a periodic search of the radio communication network for a signal; and
   means for partially scanning the frequencies of the network using one or more sequences each of which is associated with a predetermined list of frequencies selected from all said frequencies.

11. The terminal claimed in claim 10, further comprising means for selecting partial or complete scanning of the various frequencies.

12. The terminal claimed in claim 10, wherein when said intensity of the signal before the periodic search is constant, partial scanning means perform scanning using one or more sequences each of which is associated with a predetermined list of frequencies selected from all said frequencies.

13. The terminal claimed in claim 12, further comprising means for scanning all said frequencies, wherein, when the intensity of the signal before the periodic search was varying, the terminal does not perform the partial scan and scans all said frequencies using means for scanning all said frequencies.

14. A method of connecting a terminal to a radio communication network, said method comprising:
   determining whether signal intensity of the terminal is constant or not prior to the terminal performing a periodical network search; and
   performing the periodical network search by periodically scanning frequencies of the radio communication network,
   wherein the periodical network search comprises:
      when the signal intensity of the terminal is approximately constant before the periodic network search, executing a partial frequency scanning, and
      when the signal intensity of the terminal is not approximately constant before the periodic network search, performing a full scanning of all the frequencies without performing any of the partial frequency scanning.

15. The method according to claim 14, wherein:
   the intensity of the signal received by the terminal is determined just prior to a loss of the signal,
   when the determined intensity was approximately constant before the loss of the signal, the partial frequency scanning is executed and when the determined intensity was not approximately constant before the loss of the signal, only the full scanning of all the frequencies is performed,
   when the partial frequency scanning is executed, the scanning is executed in a sequence associated with a predetermined list of frequencies, the list of frequencies includes only some of all of said frequencies.

* * * * *